(12) United States Patent
Muvundamina

(10) Patent No.: US 7,163,579 B2
(45) Date of Patent: Jan. 16, 2007

(54) METHOD OF MAKING WATER RESISTANT CORRUGATED BOARDS

(75) Inventor: Mutombo J. Muvundamina, Minneapolis, MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 108 days.

(21) Appl. No.: 10/825,478

(22) Filed: Apr. 14, 2004

(65) Prior Publication Data

US 2005/0229814 A1    Oct. 20, 2005

(51) Int. Cl.
*C09J 103/02* (2006.01)
*B32B 3/28* (2006.01)
*B32B 23/06* (2006.01)

(52) U.S. Cl. .............. 106/205.31; 106/205.3; 106/211.1; 524/47; 252/363.5; 428/182; 428/530; 428/533

(58) Field of Classification Search ............ 106/205.3, 106/205.31, 211.1; 524/47; 252/363.5, 252/182.32; 428/182, 530, 533
See application file for complete search history.

(56) References Cited

U.S. PATENT DOCUMENTS

| 4,941,921 A | 7/1990 | Anic et al. |
| 5,075,360 A * | 12/1991 | Fitt et al. .............. 524/48 |
| 5,840,108 A * | 11/1998 | Karras ................. 106/211.1 |
| 6,176,917 B1 | 1/2001 | Duclaud et al. |
| 6,273,928 B1 | 8/2001 | Hayati et al. |

FOREIGN PATENT DOCUMENTS

| EP | 0 310 078 A | 4/1989 |
| EP | 0 796 907 A | 9/1997 |
| GB | 526 643 A | 9/1940 |

* cited by examiner

*Primary Examiner*—David M. Brunsman

(57) ABSTRACT

A method of using a water-based boron-containing suspension as a source of boron additive is disclosed. The method includes adding the suspension into a mixing or reaction zone during the preparation of starch-based adhesives. The suspension includes a boron compound and at least one suspension aid.

25 Claims, No Drawings

METHOD OF MAKING WATER RESISTANT CORRUGATED BOARDS

FIELD OF THE INVENTION

The present invention relates to the use of an aqueous boron-containing suspension as a source of boron additive in starch-based adhesives for making corrugated boards.

BACKGROUND OF THE INVENTION

Corrugated paperboards are made of corrugated sheets bonded through an adhesive that is placed on the flute tips of the medium (fluted sheet) to a panel (flat sheet). In the manufacture of corrugated boards, starch-based adhesives are the most widely used corrugating adhesives. While various optional ingredients may be added to the starch-based adhesive formulations to enhance the adhesive properties, starch-based adhesives typically include several basic raw materials or ingredients; they are water, starch, caustic soda (sodium hydroxide) and borax. Borax is added to the formulation to raise the viscosity and cohesiveness of the starch, and to allow the use of a relatively small amount of the polysaccharide in the formulation (than would otherwise be used in the absence of borax). Borax is typically added in solid powder or granular forms to the aqueous starch-based adhesive mixture during the formation of the adhesive. With the advent of automation, most manufacturing systems use augers to feed the solid borax into the mixer. In these configurations, two problems are generally encountered. Firstly, it is difficult to accurately meter a small amount of solid borax into the aqueous starch mixture. Secondly, the spout located at the extremity of the feeding auger is continuously wet with condensate from the steam released by the hot starch mixture, resulting in the agglomeration of the borax around the spout. This ultimately leads to the clogging of the metering device, thus, the spout requires regular downtime for cleaning.

A solution to the aforementioned issues has been proposed to use organic solvent-based boron-containing liquids instead of solid borax. The boron-containing liquids are organic solvent based solutions containing water-soluble reaction products of boric acid with organic solvent(s) such as amino compounds, e.g., aliphatic polyamines or amino-hydroxylated compounds, e.g., alkanolamines, in particular, monoethanolamine. Again, there are two major shortcomings when using organic solvent-based boron-containing solutions. First, these solutions also have fairly high viscosities, thus, accurately metering them into the slurry of the starch mixture during the preparation of the adhesive is also difficult. Secondly, the performance of the solutions used as a boron-containing additive is acceptable only for adhesive bond lines, in the final corrugated board, that do not require water-resistance; this would not meet the need for water resistant corrugated boards, especially when water-resistant starch-based corrugating adhesives have been given significant attentions in recent years.

The basic starch-based corrugating adhesive is not "water-resistant", that is, the dried glue is readily soluble in water. For example, a regular corrugated board will quickly separate into its paper components if soaked in water for a short period such as from a few minutes to about 3 hours. To impart water resistance to the adhesives, a variety of specialty resins, also known as "water proofing" resins, are typically added to the starch-based adhesives during the preparation thereof. These resins normally include aldehyde functionality, thus, are chemically reactive and tend to increase water resistance of the adhesive bond line by crosslinking with the hydroxyl groups in the starch molecules. However, the concomitant use of a "water proofing" resin and an organic solvent based boron-containing liquid, such as an amine based organic solvent system instead of solid borax, causes the resin to become ineffective and/or to lose its waterproofing attribute due to a competing reaction between aldehyde functionality in the waterproofing resin and amine functionality in the boron-containing liquid: $R'-C=O+R-NH_2 \rightarrow R'-CH=NR+H_2O$. As a result, the waterproofing resin is no longer available for crosslinking with the starch to provide water resistant to the adhesive, thereby to the corrugated board.

SUMMARY OF THE INVENTION

In one aspect, the invention features a method of using a water-based boron-containing suspension that is substantially free of organic solvent(s) as a source of boron additive in starch-based adhesives. The method includes introducing the water-based boron-containing suspension into a mixing or reaction zone during the preparation of the starch-based adhesive.

In another aspect, the invention features an aqueous starch-based adhesive that includes water, starch, caustic soda, and from about 0.05 wt % to about 10 wt % of a water-based boron-containing suspension as a source of boron additive. The water-based boron-containing suspension is substantially free of organic solvent(s), and is added during the preparation of the adhesive.

In one embodiment, the adhesive further includes at least one waterproofing additive.

In some embodiments, the adhesive exhibits wet pin bond strength of at least about 5 lbf, as measured by TAPPI T-821 test method.

In some embodiments, the adhesive exhibits wet bond strength characterized by percentage fiber tear of at least about 50% after wet pin bond strength test.

In one embodiment, the adhesive exhibits wet bond strength characterized by percentage fiber tear of at least about 70% after wet pin bond strength test.

In some embodiments, the adhesive exhibits dry pin bond strength of at least about 50 lbf, as measured by TAPPI T-821 test method.

In yet another aspect, the invention features a method of making a starch-based adhesive. The method includes mixing water, starch and caustic soda, and adding a water-based boron-containing suspension that is substantially free of organic solvent(s) as a source of boron additive into a mixing or reaction zone during the preparation of the starch-based adhesive.

In one embodiment, the method further includes adding a waterproofing additive into the mixing or reaction zone during the preparation of the starch-based adhesives.

In yet another aspect, the invention features a method of making corrugated boards. The method includes corrugating a sheet to create a medium bearing fluted tips having a first side and a second side (a first substrate), applying a starch-based adhesive of the invention to the first side of the fluted tips of the medium to create a first adhesive bearing surface, and bringing a liner (a second substrate) in contact with the first adhesive bearing surface.

In one embodiment, the method further includes applying an adhesive to the second side of the fluted tips of the medium to create a second adhesive bearing surface, and bringing a second liner substrate in contact with the second adhesive bearing surface. The adhesive may be the same starch-based adhesive of the invention. Or it may be any suitable adhesive.

In yet another aspect, the invention features a corrugated board that includes a fluted medium bearing fluted tips having a first side and a second side, a first liner substrate, and the starch-based adhesive of the invention sandwiched between the first side of the fluted tips of the medium and the first liner substrate.

In one embodiment, the fluted medium is a laminate that is composed of at least two sheets bonded together by an adhesive. The adhesive may be the same starch-based adhesive of the invention. Or it may be any suitable adhesive.

In one embodiment, the corrugated paperboard further includes a second liner substrate and an adhesive sandwiched between the second side of the fluted tips of the medium and the second liner substrate. The adhesive may be the same starch-based adhesive of the invention. Or it may be any suitable adhesive.

In yet another aspect, the invention features a laminate including a first substrate having a first surface and a second surface, a second substrate having a first surface and a second surface, and a starch-based adhesive of the invention sandwiched between the first surface of the first substrate and the first surface of the second substrate. The laminate is prepared by applying the starch-based adhesive of the invention to the first surface of the first substrate to create a first adhesive bearing surface, and having the first surface of the second substrate in contact with the first adhesive bearing surface.

In one embodiment, the first substrate is a fluted medium bearing plural fluted tips having a first side and a second side, the starch-based adhesive is applied to the first side of the fluted tips to create the first adhesive bearing surface.

In yet another aspect, the invention features a method of using a water-based boron-containing suspension as a source of boron additive in a starch-based adhesive. The method includes introducing the water-based boron-containing suspension into a mixing or reaction zone during the preparation of a starch-based adhesive. The starch-based adhesive exhibits wet bond strength characterized by percentage fiber tear of at least about 50% estimated right after wet pin bond strength test.

In yet another aspect, the invention features an article of commerce that includes a container containing a water-based boron-containing suspension as a source of boron additive for starch-based adhesives. The container bears an instruction to use the boron-containing suspension in the starch-based adhesives.

The addition of the water-based boron-containing suspension to a starch-based adhesive is particularly useful when water resistance is one of the attributes sought for the corrugated boards.

The starch-based adhesive of the invention provides additional advantageous properties such as high wet tack, better wetting and better penetration into the substrates as well as easy clean-up of the machine during and/or after the manufacture of the corrugated boards.

Other features and advantages will be apparent from the following description of the preferred embodiments and from the claims.

DETAILED DESCRIPTION OF THE INVENTION

The method of using a water-based boron-containing suspension in starch-based adhesives includes adding the suspension to a mixing or reaction zone in a batch, continuous or semi-continuous modes during the manufacture of the starch-based adhesives.

The water-based boron-containing suspension includes dispersions e.g., colloidal and noncolloidal dispersions. The suspension is substantially free of organic solvent(s), i.e., it does not contain a substantial amount, e.g., greater than about 1 wt %, of organic solvent(s), based on the total weight of the suspension. The water-based boron-containing suspension is preferably free of amine-based solvent(s). An amine-based solvent is an organic compound that has amine functionality in its molecule. Examples of the amine-based solvents include amino compounds, such as aliphatic polyamines or aminohydroxylated compounds, e.g., alkanolamines, e.g., monoethanolamine, diethanolamine, triethanolamine, etc. The water-based boron-containing suspension preferably has a viscosity of from about 1000 mPas to about 2500 mPas, more preferably from about 1500 mPas to about 2000 mPas at 77° F. (25° C.). The suspension contains from about 40% to about 60% solids and has a pH value of from about 6 to about 8. In general, the maximum particle size of the suspension is not greater than about 50 microns. By maximum it means the largest size of the particles. Preferably, the suspension has number particle size distribution of from about 100 nanometers to about 10 microns.

The water-based boron-containing suspension includes water as suspension medium, at least one boron compound, at least one suspension aid.

Useful boron compounds include substances such as boric acid and borates, e.g., borax pentahydrate, borax decahydrate, sodium pentaborate decahydrate, sodium metaborate octahydrate, potassium tetraborate tetrahydrate, potassium pentaborate octahydrate, and mixtures thereof. Commercially available boron compounds include Neobo® and Polybor®, both from U.S. Borax, (Valencia, Calif.); and V-bor® from IMC Chemicals, Inc. (Overland Park, Kans.) The water-based boron-containing suspension includes from about 5 wt % to about 60 wt % of at least one boron compound, based on the total weight of the suspension.

In one embodiment, the water-based boron-containing suspension includes from about 5 wt % to about 18 wt % of boron. In another embodiment, the water-based boron-containing suspension includes from about 8 wt % to about 13 wt % of boron.

Useful suspension aids include clays; polysaccharides, e.g., xanthan gum, cellulose ethers, alginates; surfactants; dispersion stabilizers, e.g., polyvinyl alcohol, polyvinyl pyrrolidone, polyacrylamide, hydrolyzed polyvinyl acetates, polyethylene oxide, acrylic polymers, etc; and mixtures thereof.

Examples of useful clays include natural clays and synthetic clays. Examples of natural clays includes swellable clays such as montomorillonite group of clays, e.g., sodium montomorillonite clays, sodium enriched montomorillonite clays, some of which are commercially known as Bentonite, and other clays analogous to montmorillonite such as hectorite, and sepiolite, and mixtures thereof. Examples of commercially available natural clays include IGB clay minerals from IMV Nevada, and Bentonite MB 300S from Fordamin Company limited. Examples of commercially available synthetic clays include Laponite® from Southern Clay Products (Gonzales, Tex.), and Optigel® from Süd-Chemie Rheological (Louisville, Ky.).

Examples of useful polysaccharides include those already known as gelling or thickening agents, such as cellulose derivatives e.g., Bermocoll™ from Akzo Nobel Surface Chemistry (Stenungsund, Sweden), Methocell™ from Dow Chemical Company (Midland, Mich.); alginates e.g., Kelgin; and xanthan gum, e.g., Keizan xanthan gum (Kelco Industrial Biopolymers).

The water-based boron-containing suspension includes from about 0.05 wt % to about 10 wt % of at least one suspension aid, based on the total weight of the suspension.

In one embodiment, the water-based boron-containing suspension includes from about 0.5 wt % to about 5 wt % of swellable clay and from about 0.01 wt % to about 1 wt % of a polysaccharide as suspension aids.

In one embodiment, the water-based boron-containing suspension includes from about 0.1 wt % to about 3 wt % of swellable clay and from about 0.05 wt % to about 0.2 wt % of a polysaccharide, e.g., xanthan gum, as suspension aids.

The water-based boron-containing suspension also includes from about 30 wt % to about 95 wt % of water as suspension medium, based on the total weight of the suspension.

The water-based boron-containing suspension may optionally include other ingredients such as wetting agents.

The water-based boron-containing suspension can be prepared by any suitable route. For example, the suspension can be prepared by adding boric acid and a hydrated sodium tetraborate in a substantially stoichiometric amount for sodium pentaborate into an aqueous suspension including the suspension aid(s), e.g., clay and/or polysaccharide, and any other optional ingredients and allowing them to react under agitation. Other methods of preparing the suspension include those described in WO 00/23397, which is incorporated herein by reference.

Examples of commercially available water-based boron-containing suspension include Liquid Solubor® (or XPI 2608, or Liquid Polybor®) from U.S. Borax Inc., Valencia, Calif. Detailed information regarding Liquid Solubor® can be found in U.S. Pat. No. 6,273,928, which is incorporated herein by reference.

The method of using the water-based boron-containing suspension is particularly useful in the applications in which it is desirable to add boron compound, e.g., boric acid or a borate, in a continuous or semi-continuous manner to a mixing or reaction zone. Advantageously, the method is useful in the applications in which it is required to meter a boron compound, e.g., boric acid or a borate, in a controlled or precise manner and especially under high humidity and/or heat conditions.

When used for the manufacture of a starch-based adhesive, the water-based boron-containing suspension is added in the adhesive in an amount of from about 0.05 wt % to about 10 wt %, preferably from about 0.05 wt % to about 6 wt %, based on the total weight of the adhesive.

Typically, the starch-based adhesives fall into one of two categories: carrier adhesives and no-carrier adhesives. The carrier adhesives are the most widely used formulations in the corrugating industry. It is an aqueous suspension that includes two main portions of the ingredients: a cooked (or gelatinized) starch portion that suspends (or carries—hence, the term "carrier starch") and an uncooked (or ungelatinized) starch portion. The two portions are blended to prevent the adhesive from settling. No-carrier adhesives are characterized as having no discrete cooked carrier starch to provide suspension, tack, water holdout and viscosity. These parameters are achieved by exposing all the starch in the formulation to excessive levels of caustic soda at a carefully monitored temperature.

Regardless of what category the starch adhesives are in, they typically include at least partially swollen granules under the influence of alkali (caustic soda); and boric acid or borax is added to stop the swelling effect of the alkali. Therefore, the method of the invention finds great advantageous utility in the production of these types of starch-based adhesives.

In addition, the starch-based adhesive of the invention may include at least one water proofing additive. A water-proofing additive is an additive that impart water resistance to the starch-based adhesive. Useful water-proofing additives include resins such as ketone-formaldehyde, acetone-formaldehyde, urea-formaldehyde, acetone-urea-formaldehyde, acetone-melamine-formaldehyde, resorcinol-formaldehyde, polyphenolic resins, and mixtures thereof. Examples of commercially available water proofing resins include FullProof® WB2527 series from H.B. Fuller Company; and National Ultra Guard 29-9734 from National Starch Chemicals.

The water-proofing additive is present in the starch-based adhesive in an amount of from about 0.1 wt % to about 5 wt %, preferably, from about 0.5 wt % to about 3 wt %, based on the total weight of the adhesive.

In addition, the starch-based adhesive composition of the invention may also includes other optional additives such as antimicrobial agents, defoamers, wetting agents, etc.

The aqueous starch-based adhesive of the invention can be prepared by various typical processes for making starch-based adhesives including adding the water-based boron-containing suspension as a source of boron additive into a mixing zone or reaction zone during the preparation of the adhesives.

To make a corrugated board according to the invention, in one embodiment, a flat cellulosic sheet is corrugated to create fluted tips having a first side and a second side. The starch-based adhesive of the invention is applied to a first side of the fluted tips of the medium to create a first adhesive bearing surface. A liner sheet or substrate is brought in contact with the first adhesive bearing surface under heat and pressure to produce a corrugated board known as a single-face board.

In one embodiment, two single-face boards and an additional liner sheet are bonded together to form a corrugated board known as double wall board. The adhesives used in making the double wall board may be the starch-based adhesive of the invention. Or they may be any suitable adhesives.

In one embodiment, the flat cellulosic sheet is a laminate that is composed of at least two sheets bonded together with an adhesive prior to being corrugated to create fluted tips. The adhesive may be the starch-based adhesive of the invention. Or it may be any suitable adhesive.

Depending on the end use, the starch-based adhesive can further be applied to the second side of the fluted tips of the fluted medium in a single-face board to create a second adhesive bearing surface. A second flat liner sheet or substrate, known as a double back liner, is brought in contact with the second adhesive bearing surface to produce a corrugated board known as single wall board.

In another aspect, the laminate of the invention includes a first substrate, a second substrate and a starch-based adhesive of the invention sandwiched between the first substrate and the second substrate.

The examples of the substrates include collulosic sheet, paperboard, paper, metal foil to be bonded to paper, etc.

In yet another aspect, the method of making the laminate of invention includes applying a starch-based adhesive of the invention to one surface of the first substrate to create a first adhesive bearing surface, and bringing the second substrate in contact with the first adhesive bearing surface.

In one embodiment, the first substrate is a fluted medium bearing plural fluted tips having a first side and a second side, the starch-based adhesive of the invention is applied to the first side of the fluted tips to create the first adhesive bearing surface. The second substrate is in contact with the first adhesive bearing surface of the first substrate.

In one embodiment, the first substrate is a laminate composed of at least two sheets bonded together with an adhesive prior to being corrugated. The adhesive may be the starch-based adhesive of the invention. Or it may be any suitable adhesive.

In another aspect, an article of commerce of the invention includes a container containing a water-based boron-containing suspension of the invention as a source of boron additive for starch-based adhesives. The container has an instruction to use the boron-containing suspension in the starch-based adhesives.

As stated above, the water-based boron-containing suspension can be prepared separately. Thus, packaging the water-based boron-containing suspension in a container with instructions for usage in starch-based adhesives will help consumers to properly use the suspension. While the instructions may be given in writing on the packaged product, they can also be given through any other routes including verbal by salesperson, via website, or written on labels, etc. Such instructions may include e.g., "used as additive for starch-based adhesives", or "use X amount of suspension/Y amount of adhesive", etc.

EXAMPLES

Test Procedures

Test procedures used in the examples include the following.

Dry Pin Bond Strength of the adhesive is measured by the TAPPI T-821 test method "Pin Adhesion of Corrugated Board by Selective Separation", which is incorporated herein by reference.

Wet Pin Bond Strength of the adhesive is the measurement of the wet bond strength of the adhesive bond lines that hold the different members of the corrugated boards together. It is measured by the same TAPPI T-821 test method "Pin Adhesion of Corrugated Board by Selective Separation" except that the specimens are immersed in water at room temperature for 3 hours before the testing.

Wet Bond Strength of the adhesive is also characterized by percentage fiber tear (% fiber tear), which is estimated right after TAPPI T-821 test for Wet Pin Bond Strength.

Viscosity of the starch-based adhesive is measured using Stein Hall cup at 100° F.±10° F. (37.8° C.±5.6° C.).

Viscosity of the boron-containing suspension is measured by Brookfield viscometer at 77° F. (25° C.).

Comparative Examples 1–2 and Example 3

Starch-Based Adhesives

Three (3) starch-based adhesives are prepared in a high-shear single tank mixer according to the formulas and procedures described in Table I.

TABLE I

Starch-Based Adhesives

| | Com. Ex. 1 (wt %) | Com. Ex. 2 (wt %) | Ex. 3 (wt %) |
|---|---|---|---|
| Add water | 20.2 | 20.2 | 20.1 |
| Heat to 90° F. (32.2° C.) | | | |
| Add pearl starch | 3.0 | 2.9 | 2.9 |
| Add caustic soda | 10.9 | 10.8 | 10.8 |
| Mix for 30 sec. | | | |
| Heat to 95° F. (35° C.) | | | |
| Mix for 240 sec. | | | |
| Add water | 43.4 | 43.3 | 42.4 |
| Heat to 95° F. (35° C.) | | | |
| Add pearl starch | 22.3 | 22.6 | 22.3 |
| Mix for 30 sec. | | | |
| Add Neobor ®* | 0.2 | 0.0 | 0.0 |
| Add WB6363** | 0.0 | 0.2 | 0.0 |
| Add WB6364*** | 0.0 | 0.0 | 0.2 |
| Stein Hall Viscosity at 95° F. (35° C.) | — | — | 32 sec |
| Add National Ultra Guard 29-9734**** | 0.0 | 1.3 | 1.3 |
| High shear mixing for 360 sec. | | | |
| Stein Hall Viscosity at 95° F. (35° C.) | — | 27 sec | 18 sec |
| Batch Size (in %) | 100.0 | 100.0 | 100.0 |

*Neobor ™: 5-mol borax from U.S. Borax.
**WB6363: boron-containing solution (monoethanolamine:water: 1:1) from H. B. Fuller Company.
***WB6364 boron-containing suspension from H. B. Fuller Company.
****National Ultra Guard 29-9734: ketone-formaldehyde resin from National Starch.

Examples 4–6

Corrugated Paperboards

Three adhesives prepared according to Comparative Examples 1–2 and Example 3 are used to make corrugated board samples as listed in Table II. Example 4 is a single wall board composed of three (3) elements: top liner, C fluted medium and bottom sheet. Both Example 5 and 6 are double wall boards composed of five (5) elements: top liner, B fluted medium, middle liner, C fluted medium, and bottom liner.

Wet Pin Bond Strength and Dry Pin Bond Strength of the adhesives as well as Percentage Fiber Tear (% fiber tear) are measured according to the test methods described above. The test results are also listed in Table II.

While numerous embodiments and examples have been disclosed herein, it should be apparent that modifications could be made without departing from the spirit and scope of the invention. Therefore, the appended claims are intended to cover all such modifications that are within the scope of this invention. The relevant portions of all documents disclosed herein are hereby incorporated by reference in their entirety. Reference to a document is not to be construed as an admission that such document is prior art.

TABLE II

Corrugated Boards

| Example | Additive | Board Sample | Wet Pin Bond Strength | | | Dry Pin Bond Strength | | |
|---|---|---|---|---|---|---|---|---|
| | | | Max load (lbf) | Extension (in) | fiber tear (%) | Max load (lbf) | Extension (in) | fiber tear (%) |
| Ex. 4 (Board I) | Com. Ex. 1 | 57 lb/ream kraft liner-36 lb/ream C fluted kraft medium | 4.7 | 0.024 | 0 | 140.6 | 0.103 | 90 |
| | Com. Ex. 2 | 42 lb/ream white kraft liner-36 lb/ream C fluted kraft medium | 4.9 | 0.044 | 9 | 69.8 | 0.079 | 17 |
| Ex. 5 (Board II) | Com. Ex. 1 | 57 lb/ream kraft liner-23 lb/ream B fluted kraft medium | 0.0 | 0.001 | 0 | 103.4 | 0.172 | 80 |
| | Ex. 3 | 57 lb/ream kraft liner-23 lb/ream B fluted kraft medium | 5.9 | 0.064 | 0 | 118.0 | 0.161 | — |
| | Com. Ex. 1 | 57 lb/ream kraft liner-23 lb/ream C fluted kraft medium | 0.0 | 0.001 | 0 | 89.6 | 0.056 | — |
| | Ex. 3 | 57 lb/ream kraft liner-23 lb/ream C fluted kraft medium | 7.2 | 0.046 | 16 | 141.4 | 0.089 | 50 |
| Ex. 6 (Board III) | Com. Ex. 1 | 35 lb/ream kraft liner-36 lb/ream B fluted kraft medium | 0.0 | 0.001 | 0 | 93.9 | 0.148 | 81 |
| | Ex. 3 | 35 lb/ream kraft liner-36 lb/ream B fluted kraft medium | 7.6 | 0.061 | 38 | 104.7 | 0.140 | 92 |
| | Com. Ex. 1 | 35 lb/ream kraft liner-36 lb/ream C fluted kraft medium | 0.0 | 0.001 | 0 | 151.6 | 0.092 | 98 |
| | Ex. 3 | 42 lb/ream kraft liner-36 lb/ream C fluted kraft medium | 4.0 | 0.066 | 90 | 99.7 | 0.090 | 91 |

What is claimed are:

1. A method of using a water-based boron-containing suspension as a source of boron additive in a starch-based adhesive, said water-based boron-containing suspension being substantially free of organic solvent(s), said method comprising introducing said water-based boron-containing suspension into a mixing or reaction zone during the preparation of said starch-based adhesive wherein said starch-based adhesive has a waterproofing additive including an aldehyde functionality.

2. The method of claim 1, wherein said water-based boron-containing suspension comprises:
   a) from about 5 wt % to about 60 wt % of at least one boron compound;
   b) from about 0.05 wt % to about 10 wt % of at least one suspension aid; and
   c) from about 30 wt % to about 95 wt % of water.

3. The method of claim 1, wherein said water-based boron-containing suspension comprises:
   a) from about 5 wt % to about 18 wt % boron;
   b) from about 0.5 wt % to about 5 wt % clay; and
   c) from about 0.05 wt % to about 1 wt % polysaccharide.

4. The method of claim 3, wherein said clay is swellable clay.

5. The method of claim 3, wherein said polysaccharide is xanthan gum.

6. The method of claim 1, wherein said water-based boron-containing suspension is free of amine-based solvent(s).

7. The method of claim 1, wherein said suspension has a maximum particle size of no greater than about 50 microns.

8. An aqueous starch-based adhesive, comprising:
   a) water;
   b) starch;
   c) caustic soda; and
   d) from about 0.05 wt % to about 10 wt % a water-based boron-containing suspension that is substantially free of organic solvent(s) wherein said starch-based adhesive has a waterproofing additive including an aldehyde functionality.

9. The adhesive of claim 8, wherein said water-based boron-containing suspension comprises:
   a) from about 8 wt % to about 13 wt % boron;
   b) from about 0.5 wt % to about 5 wt % clay; and
   c) from about 0.05 wt % to about 1 wt % polysaccharide.

10. The adhesive of claim 8, further comprising a waterproofing additive.

11. The adhesive of claim 10, wherein said waterproofing additive is a waterproofing resin chosen from ketone-formaldehyde, acetone-formaldehyde, urea-formaldehyde, acetone-urea-formaldehyde, acetone-mclamine-formaldehyde, resorcinol-formaldehyde, polyphenolic resin, or mixtures thereof.

12. The adhesive of claim 8, wherein said adhesive exhibits wet pin bond strength of at least about 5 lbf according to TAPPI T-821 test method.

13. The adhesive of claim 8, wherein said adhesive exhibits wet bond strength characterized by percentage fiber tear of at least about 50% estimated after wet pin bond strength test.

14. The adhesive of claim 8, wherein said adhesive exhibits a dry pin bond strength of at least about 50 lbf according to TAPPI T-821 test method.

15. A method of making starch-based adhesive of claim 8, comprising adding a water-based boron-containing suspension as a source of boron additive into a mixing zone or reaction zone during the preparation of said starch-based adhesive, said water-based boron-containing suspension being substantially free of organic solvent(s).

16. A method of making a corrugated board, comprising:
   corrugating a sheet to create a medium bearing fluted tips having a first side and a second side;
   applying a starch-based adhesive of claim 8 to the first side of said fluted tips of said medium to create a first adhesive bearing surface; and
   bringing a first liner substrate in contact with said first adhesive bearing surface.

17. The method of claim 16, wherein said sheet is a laminate composed of at least two sheets bonded with an adhesive.

18. The method of claim 17, wherein said adhesive is the starch-based adhesive of claim 8.

19. The method of claim 16, further comprising applying an adhesive to the second side of the fluted tips of the medium to create a second adhesive bearing surface; and bringing a second liner substrate in contact with said second adhesive bearing surface.

20. A corrugated board prepared according to the method of claim 16, comprising
   a) a fluted medium bearing fluted tips having a first side and a second side, b) a first liner substrate, and c) a said starch based adhesive of claim 8 sandwiched between the first side of said fluted tips of the medium and said first liner substrate.

21. The corrugated board of claim 20, further comprising a second liner substrate and an adhesive sandwiched between the second side of said fluted tips of the medium and said second liner substrate.

22. A laminate comprising a first substrate having a first surface and a second surface; a second substrate having a first surface and a second surface; and a starch-based adhesive of claim 8 sandwiched between said first surface of said first substrate and said first surface of said second substrate, said laminate being prepared by applying the starch-based adhesive of claim 8 to said first surface of said first substrate to create a first adhesive bearing surface; and having said first surface of said second substrate in contact with said first adhesive bearing surface.

23. The laminate of claim 22, wherein said laminate is a fluted medium bearing plural fluted tips having a first side and a second side, said starch-based adhesive being applied to the first side of the fluted tips to create said first adhesive bearing surface.

24. A method of using a water-based boron-containing suspension as a source of boron additive in a starch-based adhesive, said method comprising introducing said water-based boron-containing suspension into a mixing or reaction zone during the preparation of said starch-based adhesive, said starch-based adhesive exhibiting wet bond strength characterized by percentage fiber tear of at least about 50% estimated after wet pin bond strength test wherein said starch-based adhesive has a waterproofing additive including an aldehyde functionality.

25. An article of commerce, comprising a container that contains a water-based boron-containing suspension, said water-based boron-containing suspension being substantially free of organic solvent(s), said container bearing an instruction to use said suspension in a starch-based adhesive wherein said starch-based adhesive has a waterproofing additive including an aldehyde functionality.

* * * * *